United States Patent
Vincent et al.

(10) Patent No.: US 11,080,127 B1
(45) Date of Patent: Aug. 3, 2021

(54) METHODS AND APPARATUS FOR DETECTION OF PROCESS PARAMETER ANOMALIES

(71) Applicant: Arizona Public Service Company, Phoenix, AZ (US)

(72) Inventors: Jerrold Vincent, Phoenix, AZ (US); Bradley Fox, Goodyear, AZ (US)

(73) Assignee: Arizona Public Service Company, Phoenix, AZ (US)

( * ) Notice: Subject to any disclaimer, the term of this patent is extended or adjusted under 35 U.S.C. 154(b) by 246 days.

(21) Appl. No.: 16/289,228

(22) Filed: Feb. 28, 2019

Related U.S. Application Data (60) Provisional application No. 62/636,335, filed on Feb. 28, 2018.

(51) Int. Cl.
*G06F 11/00* (2006.01)
*G06F 11/07* (2006.01)
*G06N 3/08* (2006.01)

(52) U.S. Cl.
CPC ........ *G06F 11/079* (2013.01); *G06F 11/0751* (2013.01); *G06N 3/08* (2013.01)

(58) Field of Classification Search
CPC .............. G06F 11/0709; G06F 11/079; G06F 11/2257; G06F 11/2266; G06F 11/2263; G06F 11/0706
USPC ........................................................ 714/1–57
See application file for complete search history.

(56) References Cited

U.S. PATENT DOCUMENTS

| | | |
|---|---|---|
| 5,070,468 A | 12/1991 | Niinomi et al. |
| 6,625,569 B2 | 9/2003 | James et al. |
| 7,756,678 B2 | 7/2010 | Bonissone et al. |
| 2004/0243636 A1 | 12/2004 | Hasiewicz et al. |
| 2007/0005311 A1 | 1/2007 | Wegerich et al. |
| 2007/0289013 A1 | 12/2007 | Lim |
| 2009/0299695 A1 | 12/2009 | Subbu et al. |
| 2011/0137469 A1* | 6/2011 | Sharma ............ H05K 7/20836 700/282 |
| 2013/0318011 A1* | 11/2013 | Jones ..................... G05B 23/02 706/12 |
| 2014/0109124 A1* | 4/2014 | Morales .......... H04N 21/44204 725/14 |
| 2014/0325292 A1* | 10/2014 | Spivey ............... G05B 23/0221 714/48 |
| 2015/0019912 A1* | 1/2015 | Darling ............... G06F 11/2257 714/26 |
| 2016/0154690 A1* | 6/2016 | Horrell ............... G06F 11/0709 714/57 |
| 2017/0206464 A1* | 7/2017 | Clayton ............... G06N 3/0445 |
| 2017/0308427 A1* | 10/2017 | Cheng .................... H04L 41/064 |
| 2018/0189128 A1* | 7/2018 | Qiao .................. G06F 11/0727 |
| 2018/0285772 A1* | 10/2018 | Gopalan ................ G06N 7/005 |
| 2019/0129819 A1* | 5/2019 | Guo ..................... G06F 11/263 |

* cited by examiner

*Primary Examiner* — Sarai E Butler
(74) *Attorney, Agent, or Firm* — Noblitt & Newson, PLLC (57) ABSTRACT

Methods and apparatus for identifying anomalies in data may operate in conjunction with a processing system and an output. The system may receive actual data and generate nominal data according to the actual data. The system may compare the actual data to the nominal data and identify an outlier in the actual data compared to the nominal data. The output may provide information relating to the identified outlier. In various embodiments, the system may include a neural network.

33 Claims, 5 Drawing Sheets

Fig. 5

METHODS AND APPARATUS FOR DETECTION OF PROCESS PARAMETER ANOMALIES

CROSS-REFERENCE TO RELATED APPLICATION

This application claims the benefit of U.S. Provisional Patent Application No. 62/636,335, filed Feb. 28, 2018, and incorporates the disclosure of that application by reference.

BACKGROUND

Many plants include equipment performing functions supporting industrial and infrastructure activities. The equipment is often expensive and performing vital functions. Degradation and defects in such equipment should be identified to isolate or repair the equipment before failure and disruption of plant operations or physical damage.

Equipment health monitoring systems monitor equipment steady state physical characteristics and generate an alarm in response to deviations from target settings. Faults may be investigated and corrected before a greater failure. Some techniques provide early warning of equipment failure. Generally, such monitoring systems require significant manual investment to develop predictive models.

SUMMARY OF THE INVENTION

Methods and apparatus for identifying anomalies in data may operate in conjunction with a processing system and an output. The system may receive actual data and generate nominal data according to the actual data. The system may compare the actual data to the nominal data and identify an outlier in the actual data compared to the nominal data. The output may provide information relating to the identified outlier. In various embodiments, the system may include a neural network.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

DETAILED DESCRIPTION OF EXEMPLARY EMBODIMENTS

Various aspects of the present technology may be described in terms of functional block components and various processing steps. Such functional blocks may be realized by any number of hardware or software components configured to perform the specified functions and achieve the various results. For example, exemplary embodiments of the present invention may employ various sensors, equipment, generation assets, data streams, computers, neural network models, interfaces, and the like, which may carry out a variety of functions. In addition, various aspects of the present invention may be practiced in conjunction with any number of environments, and the systems and methods described are merely exemplary applications for the invention. Further, exemplary embodiments of the present invention may employ any number of conventional techniques for generating data, monitoring data, processing data, and the like.

Methods and apparatus for detection of process parameter anomalies according to various aspects of the present technology may provide monitoring of process parameter data for abnormal indications. For example, the methods and apparatus may provide a system that predicts, groups, and displays anomalous behavior in data to a user. The system may include a machine-implemented system, such as a software system running on a computer, that receives one or more sets of time series data and outputs grouped time-series sets that exhibit abnormal behavior.

In various embodiments, the system may detect abnormal trends and patterns in time series data. Deviations from normal trends may indicate degrading system or component performance predicating a significant event. The present methods and apparatus may provide automated and continuous monitoring of time series process parameters for abnormal indications. In particular, the system may receive and store process parameter data, such as into a software database system, preprocess the process parameter data such as for removal of aberrant data, and group process data streams, such as by mathematical relationships.

The process parameter data may comprise time series data, such as data from sensors and status indicators, and the system may comprise an automated system that continuously monitors and processes the data. In various embodiments, process parameter data may be organized, such as via a database, and preprocessed, for example to remove aberrant data. In addition, process data streams may be grouped, such as to facilitate identifying multivariate abnormalities. The anomaly detection system may analyze the process parameter data for outliers or other indicators of anomalous behavior.

Various aspects of the present methods and apparatus may be applied to automatic anomaly detection over any set of process parameter data. Various embodiments may be adapted for anomaly detection where the different data series, like operational data from different sources, correlate or interrelate, such as in a moderately consistent manner.

In one embodiment, the present methods and apparatus are implemented in a power generation system comprising multiple generation assets and related equipment. The anomaly detection system may maintain the health of the generation assets, such as through monitoring and diagnostics, to facilitate producing cost-effective and reliable energy. In one embodiment, the anomaly detection system comprises provides automated monitoring of generation asset process parameters, which may reduce costs associated with monitoring the status and operation of the assets and identify potential issues in advance. The anomaly detection system, however, may be adapted to various environments, including nuclear power generation facilities, non-nuclear power generation facilities, manufacturing plants, and petroleum processing plants. Various aspects of the system may also be deployed in other areas where multivariate time series data is analyzed for outliers or anomalous behavior.

Figure 1:
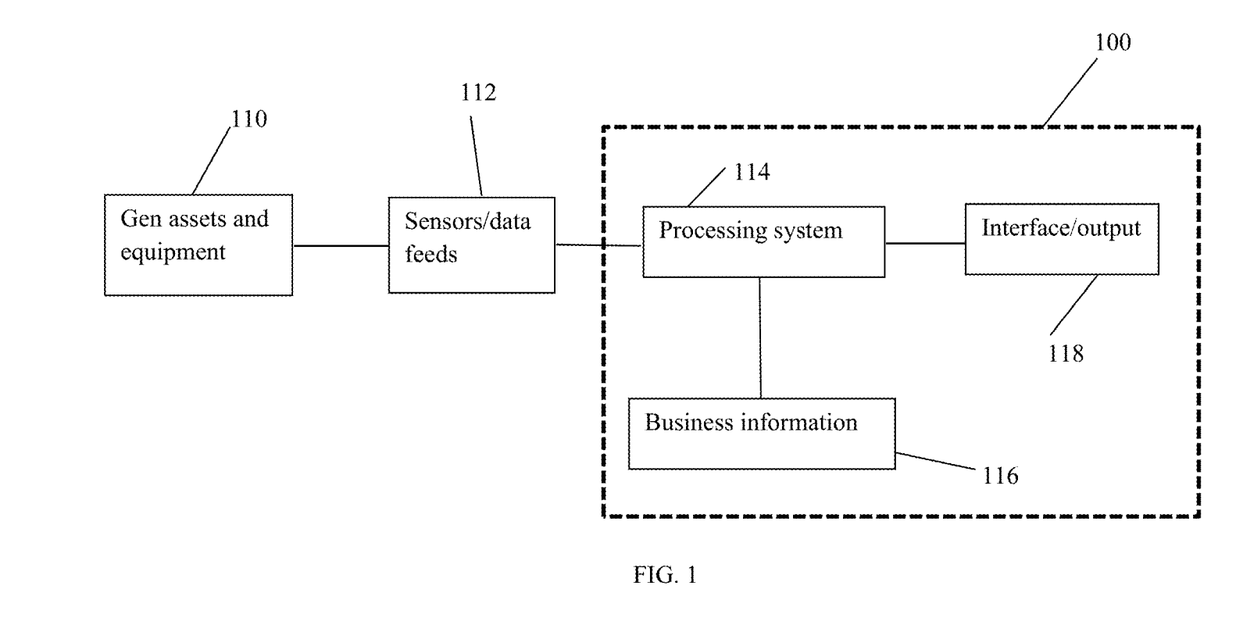
FIG. 1 is a block diagram of an anomaly identification system according to various aspects of the present invention.
Figure 4:
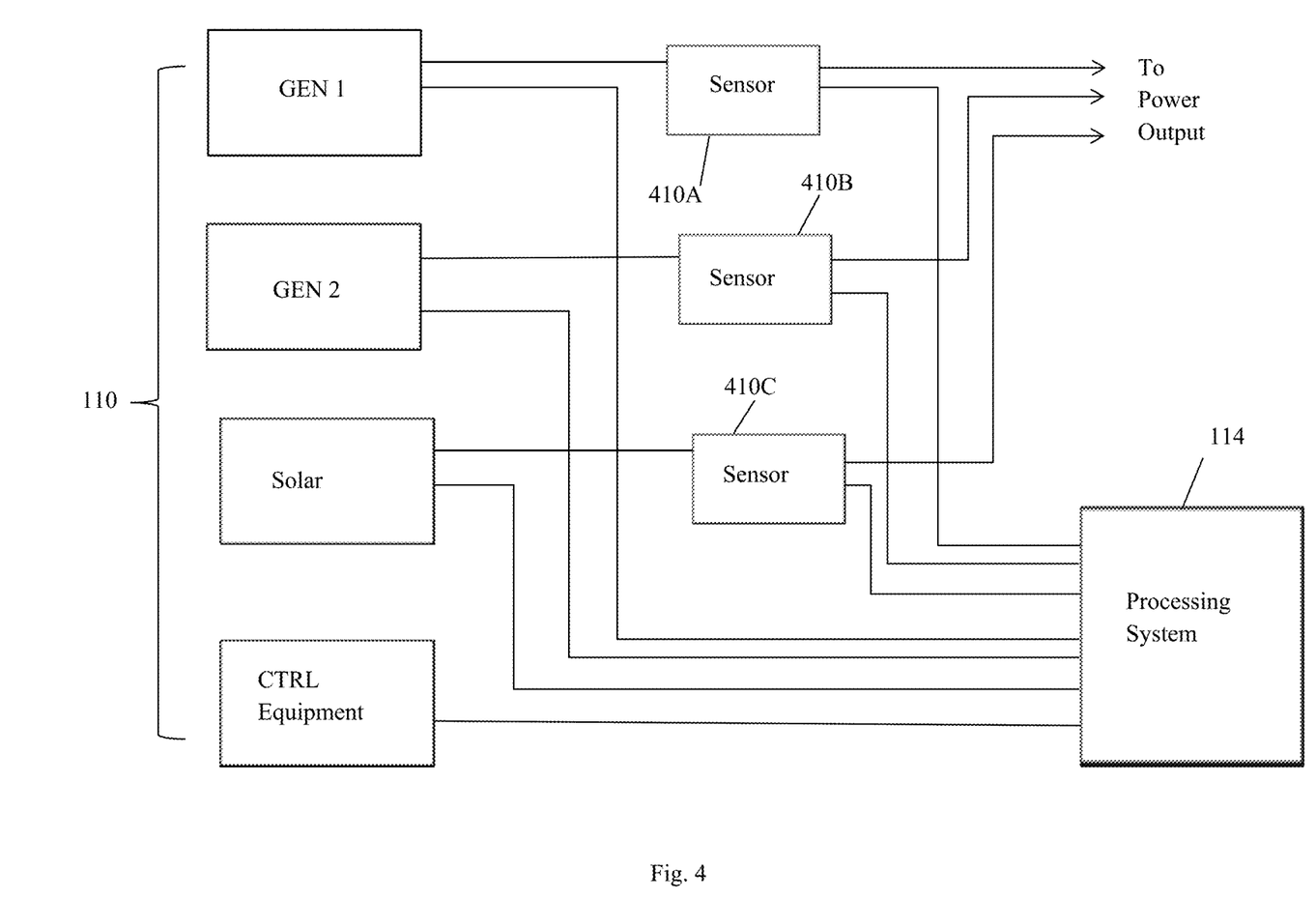
FIG. 4 is a diagram of multiple assets and sensors providing signals to a processing system.

For example, referring to FIGS. 1 and 4, an exemplary anomaly detection system 100 may operate in conjunction with a power generation facility comprising one or more generation assets 110, such as nuclear, fossil fuel, solar, or wind generation assets. The facility may further include other equipment, such as control and support systems. The various generation assets 110 and other equipment may generate signals indicating their status and function. In addition, one or more sensors 410 may generate signals associated with the operation of the generation assets 110 and other equipment, such as voltage, current, and/or frequency information.

The various data 112 from the assets 110, sensors 410, and/or other sources may be provided to the processing system 114 to detect anomalies in the data, such as by applying outlier detection criteria to identify outliers in the data. The anomaly detection system 100 may further include a business system 116 that monitors the output of the processing system 114 and applies business criteria relating to the operation of the assets 110 to refine the usefulness of the results. The refined results may be provided to an output 118, such as a user interface, reporting system, and/or database.

The anomaly detection system 100 may be implemented in any appropriate manner, such as a local or remote computer or computer array. In one embodiment, the anomaly detection system 100 may comprise one or more computers operating remotely, such as in the "cloud," and receive the data 112 remotely and provide output to a remote system. In another embodiment, the anomaly detection system 100 is implemented on a local computer system that operates on the same site as the assets 110.

In the present exemplary embodiment, the data 112 comprises time series data, such as data from a PI System from OSIsoft, LLC. PI sensor points may be included that meet certain characteristics, such as PI sensor points from important plant systems and/or that have a particular quality, such as PI sensor points marked as valid data in the PI system.

The data 112 may represent operating parameters of various systems, such as the assets 110. For example, the data 112 may include voltage, current, and/or frequency for the output of the generation assets, as well as other data such as temperature, vibration, signal consistency, responsiveness, or any other information that may vary over time and relate to the status and/or operation of the relevant assets 110.

The data 112 may be organized into models comprising multiple sets of data. For example, a model may comprise a group of related of time-series data points, such as PI points, that are grouped together into a multivariate dataset. The models may be organized according to any suitable criteria, such as based on a combination of their scores and other attributes.

In various embodiments, models may be constructed functionally, such as with related points using domain knowledge. For example, the models may represent physical co-location, like a component or plant system. In one embodiment, models may be constructed utilizing PI Point Tag System designators. For example, a model may be based on all PI points from the same plant functional system. Alternatively, domain-informed techniques may utilize subject matter expertise to provide a set of related PI points for a model.

Models may also be constructed with related points, such as using a mathematical correlation. Mathematical models may represent groups of points that mathematically vary together in similar fashion. For example, statistics-informed methods may be used, such as to identify individual points or plant functional systems that are correlated with each other. In various embodiments, points may be selected automatically via feeding aggregated correlation coefficients between PI points into a hierarchical clustering model.

Different models may be applied to the same data 112 to generate different groups of data. Further, custom models can also be constructed based on a specified set of points. Each group may comprise a time series multivariate dataset based on the data in the model's group such that the model's time series data corresponds to the combined data of the group of individual datasets.

The processing system 114 may receive the data 112 and/or multivariate datasets and identify anomalies in the data, such as to identify potential and/or impending system failures or defects among the generation assets 110. In the present exemplary embodiment, referring to FIG. 5, the processing system 114 may receive at least a portion of the data 112 and/or the multivariate dataset 508 and generate a corresponding predicted output for the multivariate dataset 508. The predicted output may be compared to the actual output for the multivariate dataset 508 to generate a delta dataset reflecting the difference between them.

Figure 5:
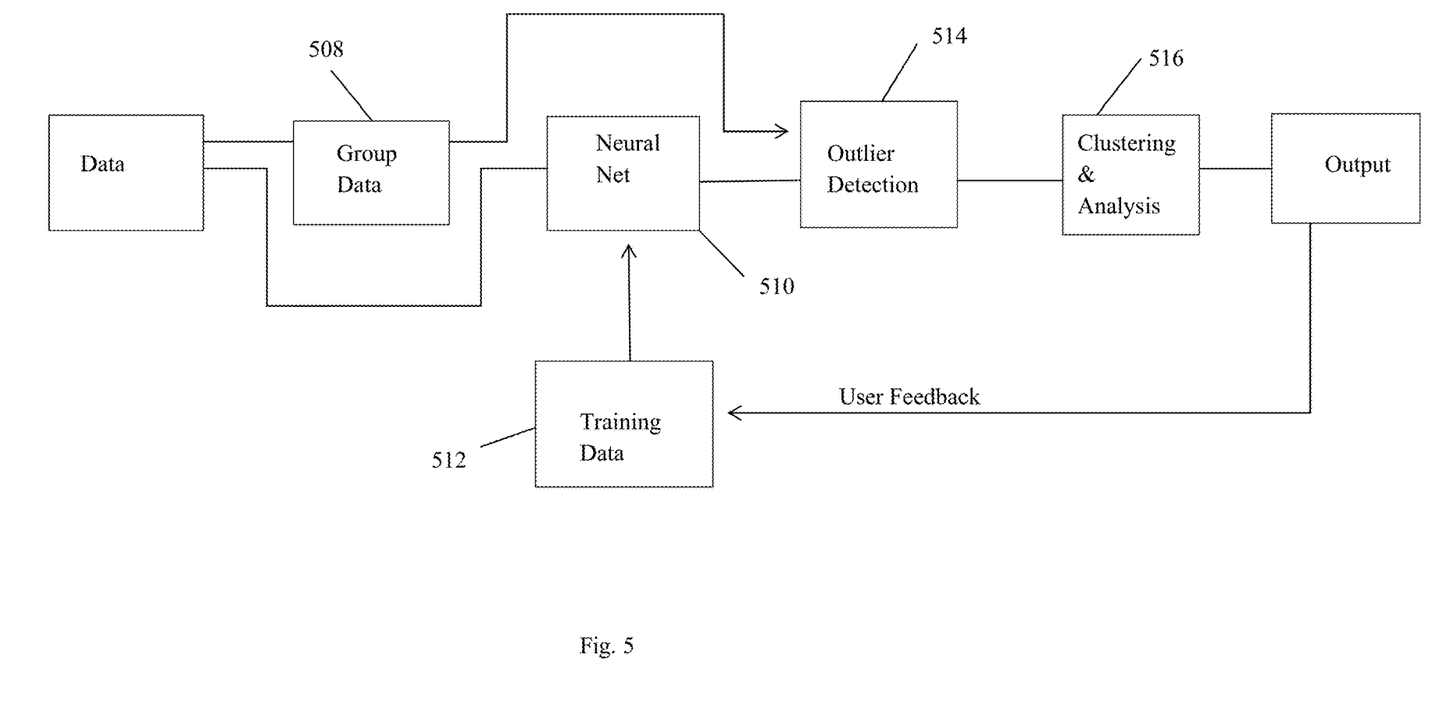
FIG. 5 is a diagram of a processing system.

The processing system 114 may be implemented via one or more computer systems, such as a computer system implementing a neural network 510. For example, the computer system may operate a recurrent neural network model, an auto-encoding neural network model, a recurrent auto-encoding neural network model, and/or other suitable neural network. The neural network 510 models may train on groups of data, such as the historical data corresponding to the multivariate datasets 508, to learn normal operating states. The neural network 510 may generate model "predictive" data for the multivariate datasets based on the training data.

In various embodiments, predicted time-series values are the primary output of a trained model of the neural network 510. The model predictions may be calculated utilizing a trained neural network 510 constructed to a specific architecture that enables it to intake and output groups of time-series data at one time. The neural network 510 may be trained on some amount of historical normal data 512, for which it programmatically learns the relationships between all series. The trained neural network 510 may contain or effect mathematical functions that can calculate the value of any one learned point as a function of all other points. New actual data may be passed through the trained neural network 510 and the output is considered as the predicted value. Note that this "predictive" data is not forward looking, but rather a calculated value as a function of current input data where the functions represent previously learned relationships.

These models may be kept up to date, for example with an online retraining process that occurs at selected times, such as once per day with data that looks back once per day. In each retraining, the neural network 510 is slightly adjusted such that it is tuned to more accurately predict actual data. The updating process tends to keep the models accurate as normal changes occur in the physical world.

In the present embodiment, neural networks 510 enable identifying the nominal status of the current parameter state not just as a function of the current state, but also as a function of immediately preceding states. This provides the ability to detect anomalies in not just parameter values, but 2nd order anomalies, such as cyclicality. Auto-encoding neural networks, unlike some other advanced pattern recognition software (e.g. similarity-based modeling), may enable a model to train accurately on a multiple order of magnitude larger number of unique parameters. This technique can model thousands of points in one model, whereas other models can only handle tens of points. This helps reduce the time to setup and maintain models, as well as provide the capability to explain a larger amount of variance in process parameters.

The recurrent auto-encoding neural network 510 architecture of the present embodiment may be dynamically altered, such as at training time. For example, the architecture may be selected according to the size and shape of the training data 512, which may allow larger variance in the amount of process parameters used to develop models without a corresponding reduction in predictive accuracy that would otherwise occur without an architectural change. Contrast this embodiment with systems in which the model construction details are predetermined with a specific set of parameters that define the model architecture. For example, these parameters may be the number of nodes or layers in a neural network. In the present exemplary system, these parameters may change dynamically based on the size and shape of the initial training set 512. This feature may allow the model creation functionality to be directed to a set of data and allow the function to choose the best parameters to construct the model automatically. This implementation may also require less human effort and attention in model training.

Figure 2:
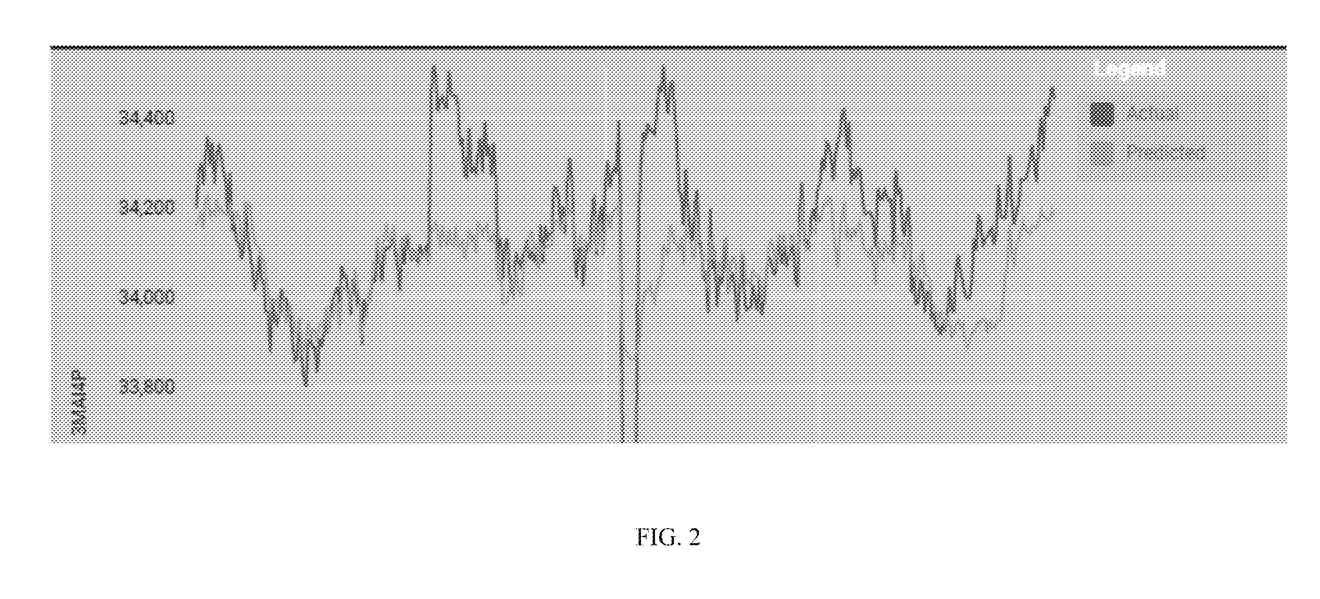
FIG. 2 is a graph of multivariate actual data and multivariate predictive data.

The processing system 114 may include an outlier detection system 514 to, referring to FIG. 2, compare the actual data 112 to the model data for outliers and other abnormalities, and save the results, such as to a software database, for further use. In various embodiments, the outlier detection may be performed using a hardwired module, firmware, or an outlier identification system implemented by a computer. The prediction models generated by the neural network 510 may be used to identify anomalies, such as to produce a score of abnormality for current process parameter data at a predefined time interval.

For example, once a predicted value has been calculated, the system may calculate a delta value between the actual value and the predicted value, which may be referred to as a "residual." The residual represents either a change in the actual value when compared historical norms, captured as information contained within the neural net, or an inaccuracy in the initial model. In either instance, outliers in the residual can be interpreted as changes in performance as captured by the neural network 510. As the neural network 510 has been trained on historical norms, any large changes, or outliers, in the residuals represent changes in actual data as compared to historical norms.

Outliers may be detected via statistical tests over a selected period, such as a seven-day rolling window. The outlier types may comprise any suitable outliers or anomalies, such as:
  Additive Outlier: An additive outlier appears as a surprisingly large or small value occurring for a single observation. Subsequent observations are unaffected by an additive outlier.
  Innovational Outlier: An innovational outlier is characterized by an initial impact with effects lingering over subsequent observations.
  Level Shift Outlier: For a level shift, all observations appearing after the outlier move to a new level.

In various embodiments, the outlier detection system 514 may perform outlier detection on groups of process parameters and/or multivariate datasets instead of just one at a time. For example, the outlier detection system 514 may build a similarity matrix between all the parameters in a model, such as by using a combination of different similarity measures, e.g., the absolute values of parameter residual correlation coefficients.

Figure 3:
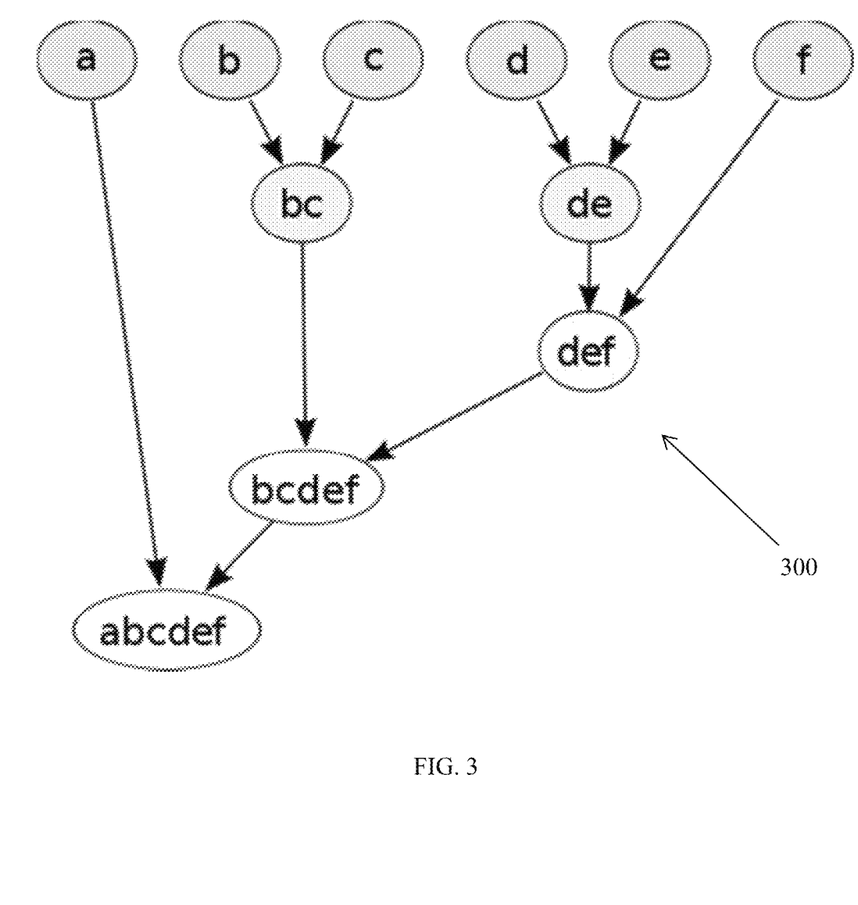
FIG. 3 is a diagram of a hierarchical tree.

Referring to FIG. 3, the outlier detection system 514 may perform a hierarchical cluster analysis on the matrix. The hierarchical tree 300 may be traversed depth-first, and at each tree node outlier detection tests may be run on the residuals of parameters in the sub-tree. Once a sub-tree is found to be an outlier, the outlier is noted and the algorithm may stop traversing that sub-tree.

The testing of outliers on groups of parameters instead of on individual points allows identified abnormalities to be multi-variate. Grouping related parameters together may be helpful for end users evaluating abnormalities by reducing the number of anomalies and improving the quality of abnormality evaluation by co-locating relevant data. Using a similarity matrix and hierarchal clustering may also provide flexibility in defining the relatedness of process parameters and characteristics of abnormal process parameter groups.

In various embodiments, the outlier detection system 514 may comprise one or more supervised machine learning models to process identified anomalies. For example, a supervised machine learning model may score detected abnormalities such that the detected abnormalities are given a probability of being "valid."

The machine learning architecture may also incorporate business information 116, such as information relating to deliberate variations in conjunction with testing or maintenance and other informational data in determining if a detected event was a true/false positive. This implementation may help rank abnormalities by the probability of being valid, improve the value received from human evaluation and provide the potential capability to automatically address and/or evaluate abnormalities if the model confidence is high.

Sensitivity to outliers may be controlled by a single numerical value that is input into the functions used for outlier detection. In one embodiment, sensitivity may be initialized to a value that results in approximately one outlier per point, such as a PI point or other data point, per week or other suitable time period, and further tuned via user feedback.

The present outlier detection system 514 may perform the anomaly detection in a way that requires much less human effort and time when compared to other technologies. Additionally, other technologies are algorithmically limited to how many concurrent process parameters streams can be compared at one time.

The present outlier detection system 514 provides an improvement in the algorithm design such that when compared to competing products, many more process parameter streams can be monitored and compared as a group. This may provide less human time required to define groups of parameters within the software system, less domain expertise required to assemble such groups, and additional variance in the process data streams can be explained, which leads to more accurate modeling capability and a lower false positive rate. Additionally, inclusion of business contextual data in the anomaly detection and disposition process may help reduce false positive rate and speed investigation of true positives.

Grouping related parameters may be performed in any appropriate manner. In one embodiment, after outlier detection is performed on each time-series data set included in the specific model, a clustering system 516 may be used to group the individual series into groups of series that are related. For example, referring again to FIG. 3, all the residuals may be compared for similarity via cross-correlation, such as using a correlation analysis on a computer or other automated system. In this embodiment, the residuals are used as a distance metric in hierarchical clustering in which the nearest series are clustered together, starting from all points and working towards one large cluster. This operation produces a series of larger and larger clusters, each containing more points than the last.

Outlier detection is then performed over each sum of the residuals in each node of the cluster tree, modifying sensitivity as the node sizes change. The cluster tree is split when outlier detection no longer returns an outlier, and the nodes in the split tree are aggregated into a group of time-series data sets. These data sets represent original time-series data sets that were abnormal in similar ways, at the same time. This approach has been found to work extraordinarily well in practice, in which time series data related to similar pieces of equipment are grouped together without any information specifically regarding the equipment.

Once outlier detection has been performed on the grouped clusters, and it has been determined that an outlier exists, the clustering system 516 may compare the grouped cluster to other similar clusters over a discrete time and space range, such as with a fuzzy match algorithm. The fuzzy match algorithm may create a similarity metric based on the included time-series points in the current cluster and the previously identified clusters. If a previously identified cluster has very similar points, and is nearby in time, the anomalous behavior of the current cluster may be considered a continuation of the previous cluster, and the clusters may be grouped together. If the cluster is not similar to any other clusters, a new anomaly is created and displayed in the user interface 118. Existing anomalies may also be compared to previous and current anomalies and if similar enough, may be grouped together to form a larger anomaly.

The method in which this grouping is performed may be superior to competing systems, where grouping may be limited or non-existent. In this embodiment, grouping may be performed prior to outlier detection, in which combinations of many process parameters are tested as one data stream. This allows the present embodiment to automatically identify process parameters that may be unrelated in the process domain, but behaving abnormally at the same time. This grouping may be passed to the end user via the user interface 118, which may save time in investigation of detected abnormalities, and can provide novel insights into previously unknown process parameter relationships.

The abnormally behaving groups of parameters and/or other anomaly data may be presented via the output 518 to the user interface 118. In various embodiments, the results may be presented with contextual business information, which may assist the end user in evaluating the data for false positives and speed investigation of true positives.

User feedback may be obtained through the user interface 118. In addition, the processing system 114 may capture user feedback and automatically update statistical parameters in the outlier detection algorithm accordingly. Using user feedback may help "tune" the system by increasing and/or decreasing statistical sensitivity to certain process parameters and types of outliers, as opposed to having to manually pre-define sensitivity levels.

For example, the user interface 118 may receive anomaly status information for the various results, which may be used to adjust the sensitivity levels of the time-series points included in the current anomaly for the related model. In one embodiment, if an anomaly is invalidated, the sensitivities of the time series points may be decreased during future outlier detection. No change in sensitivity may be made if an anomaly is marked as being valid, as being bad data, for addition to a watchlist, or for generation of a condition report to describe an issue or abnormality. Sensitivities may be increased through an exponential time decay method, in which the sensitivities are moved fractionally higher over some time period.

Sensitivity tuning provides an avenue for the user to train the system to screen out noisy time-series data, while retaining the ability of the system to detect major changes in the underlying time-series data. Decaying sensitivities may inhibit any one user from decreasing sensitivities past the point where no anomalous events would be detected regardless of severity.

In the foregoing specification, the invention has been described with reference to specific exemplary embodiments. Various modifications and changes may be made, however, without departing from the scope of the present invention as set forth in the claims. The specification, figures, and appendices are illustrative, not restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages, and solutions to problems have been described above with regard to particular embodiments. Any benefit, advantage, solution to problem, or any element that may cause any particular benefit, advantage, or solution to occur or to become more pronounced are not to be construed as critical, required, or essential features or components of any or all the claims.

The terms "comprise," "comprises," "comprising," "having," "including," "includes," or any variations of such terms, are intended to reference a nonexclusive inclusion, such that a process, method, article, composition, or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

The invention claimed is:

1. A system for identifying anomalies in actual time series data from multiple sources, comprising: a processing system, implemented via one or more computer systems, configured to receive the actual time series data, wherein the processing system comprises a neural network generating a nominal predictive time series dataset according to the actual time series data, and wherein the processing system: compares the actual time series data to the nominal predictive time series dataset; and identifies an outlier in the actual time series data compared to the nominal predictive time series dataset; and an output responsive to the processing system and providing information relating to the identified outlier.

2. A system for identifying anomalies according to claim 1, wherein the neural network comprises a recurrent auto-encoding neural network.

3. A system for identifying anomalies according to claim 1, wherein:
the neural network groups actual time series data from a plurality of sources to generate a multivariate nominal predictive time series dataset; and
the processing system groups actual time series data from the plurality of sources to create a multivariate actual time series dataset, compares the multivariate actual time series dataset to the multivariate nominal predictive time series dataset, and identifies the outlier in the multivariate actual time series dataset compared to the multivariate nominal predictive time series dataset.

4. A system for identifying anomalies according to claim 3, wherein the processing system identifies primary clusters of correlated multivariate actual time series datasets.

5. A system for identifying anomalies according to claim 4, wherein the processing system identifies secondary clusters comprising primary clusters correlating at least one of temporally and spatially.

6. A system for identifying anomalies according to claim 1, wherein the processing system selects the plurality of sources according to a similarity matrix populated with historical actual time series data.

7. A system for identifying anomalies according to claim 1, wherein an architecture of the neural network is dynamically alterable at a training time according to at least one of a size and a shape of a set of training data.

8. A system for identifying anomalies according to claim 1, wherein the processing system identifies the outlier according to an outlier detection parameter, and wherein the processing system modifies the outlier detection parameter according to a user feedback input.

9. A system for identifying anomalies according to claim 1, wherein the processing system further comprises a supervised learning machine model, and wherein the supervised learning machine model assigns a validity probability score to the outlier.

10. A system for identifying anomalies according to claim 1, wherein the processing system groups multiple outliers using a similarity matrix.

11. A system for identifying anomalies according to claim 1, wherein the processing system identifies the outlier in conjunction with a sensitivity, and wherein the processing system adjusts the sensitivity in response to an invalidly identified outlier.

12. A system for identifying anomalies according to claim 1, wherein the processing system identifies the outlier in conjunction with a sensitivity, and wherein the processing system automatically increases the sensitivity over a time period.

13. A system for identifying anomalies in multiple streams of actual time series data from multiple power generation sources, comprising: a recurrent auto-encoding neural network configured to receive the actual time series data, wherein the recurrent auto-encoding neural network generates a multivariate nominal predictive dataset based on a group of the streams of the actual time series data from the multiple power generation sources; a processing system, implemented via one or more computer systems, responsive to the recurrent auto-encoding neural network, wherein the processing system: compares the multivariate nominal predictive dataset data sot to an actual multivariate dataset based on the group of the streams of the actual time series data from the multiple power generation sources to generate a delta dataset; and identifies an outlier in the delta dataset; and an output responsive to the processing system and providing information relating to the identified outlier.

14. A system for identifying anomalies according to claim 13, wherein the processing system identifies primary clusters of the actual multivariate datasets.

15. A system for identifying anomalies according to claim 14, wherein the processing system identifies secondary clusters comprising primary clusters correlating at least one of temporally and spatially.

16. A system for identifying anomalies according to claim 13, wherein the processing system selects the multiple power generation sources according to a similarity matrix populated with historical actual time series data.

17. A system for identifying anomalies according to claim 13, wherein an architecture of the recurrent auto-encoding neural network is dynamically alterable at a training time according to at least one of a size and a shape of a set of training data.

18. A system for identifying anomalies according to claim 13, wherein the processing system identifies the outlier according to an outlier detection parameter, and wherein the processing system modifies the outlier detection parameter according to a user feedback input.

19. A system for identifying anomalies according to claim 13, wherein the processing system further comprises a supervised learning machine model, and wherein the supervised learning machine model assigns a validity probability score to the outlier.

20. A system for identifying anomalies according to claim 13, wherein the processing system groups multiple outliers using a similarity matrix.

21. A system for identifying anomalies according to claim 13, wherein the processing system identifies the outlier in conjunction with a sensitivity, and wherein the processing system adjusts the sensitivity in response to an invalidly identified outlier.

22. A system for identifying anomalies according to claim 13, wherein the processing system identifies the outlier in conjunction with a sensitivity, and wherein the processing system automatically increases the sensitivity over a time period.

23. A method for identifying anomalies in multiple streams of actual time series data from multiple power generation sources, comprising:
generating a multivariate nominal predictive dataset based on a group of the streams of the actual time series data from multiple power generation sources;
generating a delta dataset according to a comparison of the multivariate nominal predictive dataset to an actual multivariate dataset based on the group of the streams of the actual time series data from the multiple power generation sources;
identifying an outlier in the delta dataset; and
providing information relating to the identified outlier at an output.

24. A method for identifying anomalies according to claim 23, wherein generating the multivariate nominal predictive dataset comprises using a recurrent auto-encoding neural network to generate the multivariate nominal predictive dataset.

25. A method for identifying anomalies according to claim 23, further comprising identifying primary clusters of the actual multivariate datasets.

26. A method for identifying anomalies according to claim 25, further comprising identifying secondary clusters comprising primary clusters correlating at least one of temporally and spatially.

27. A method for identifying anomalies according to claim 23, further comprising selecting the multiple power generation sources according to a similarity matrix populated with historical actual time series data.

28. A method for identifying anomalies according to claim 23, wherein generating the multivariate nominal predictive dataset comprises using a neural network, and further comprising dynamically altering an architecture of the neural network at a training time according to at least one of a size and a shape of a set of training data.

29. A method for identifying anomalies according to claim 23, further comprising identifying the outlier according to an outlier detection parameter; and modifying the outlier detection parameter according to a user feedback input.

30. A method for identifying anomalies according to claim 23, further comprising assigning a validity probability score to the outlier.

31. A method for identifying anomalies according to claim 23, further comprising grouping multiple outliers using a similarity matrix.

32. A method for identifying anomalies according to claim 23, further comprising identifying the outlier in conjunction with a sensitivity; and adjusting the sensitivity in response to an invalidly identified outlier.

33. A method for identifying anomalies according to claim 23, further comprising identifying the outlier in conjunction with a sensitivity; and automatically increasing the sensitivity over a time period.

* * * * *